(12) United States Patent
Richardson et al.

(10) Patent No.: US 6,322,489 B1
(45) Date of Patent: Nov. 27, 2001

(54) DRILL CUTTINGS SOLIDIFICATION FOR WETLANDS RESTORATION

(75) Inventors: Timothy R. Richardson, The Woodlands, TX (US); Paul M. Hanson, Anchorage, AK (US)

(73) Assignee: M-I LLC, Houston, TX (US)

( * ) Notice: Subject to any disclaimer, the term of this patent is extended or adjusted under 35 U.S.C. 154(b) by 0 days.

(21) Appl. No.: 09/487,362

(22) Filed: Jan. 19, 2000

Related U.S. Application Data

(60) Provisional application No. 60/116,366, filed on Jan. 19, 1999.

(51) Int. Cl.[7] ............................................. B09B 3/00
(52) U.S. Cl. ........................ 588/252; 175/66; 210/713; 210/747; 405/129.3; 405/129.35; 405/129.45; 588/259
(58) Field of Search ........................... 175/66; 210/713, 210/747, 749; 405/129.1, 129.25, 129.3, 129.35, 129.45, 129.55; 507/905; 588/252, 257, 259

(56) References Cited

U.S. PATENT DOCUMENTS

| | | | |
|---|---|---|---|
| Re. 33,747 | * 11/1991 | Hartley et al. | 405/129.3 X |
| 2,164,536 | * 7/1939 | McCarthy | 405/129.1 |
| 4,028,240 | * 6/1977 | Manchak, Jr. | 588/252 |
| 4,175,039 | * 11/1979 | Fisher | 210/747 |
| 4,251,362 | * 2/1981 | Tillie | 210/713 X |
| 4,592,846 | * 6/1986 | Metzger et al. | 210/747 |
| 4,611,951 | * 9/1986 | Sapp | 405/129.2 |
| 4,913,585 | * 4/1990 | Thompson et al. | 405/129.25 |
| 4,942,929 | * 7/1990 | Malachosky et al. | 175/66 |
| 5,277,519 | * 1/1994 | Nahm | 405/129.3 |
| 5,422,012 | * 6/1995 | Adams | 210/747 X |
| 5,430,237 | * 7/1995 | Sharp | 588/252 |
| 5,547,925 | * 8/1996 | Duncan, Jr. | 507/905 X |
| 5,690,827 | * 11/1997 | Simmering et al. | 210/747 X |

* cited by examiner

Primary Examiner—George Suchfield
(74) Attorney, Agent, or Firm—Howrey, Simon, Arnold & White LLP

(57) ABSTRACT

A method of restoring wetlands is provided, by separating drill cuttings from drilling fluid, mixing the cuttings with a stabilization medium, and then filling a desired position in the marshland or wetlands with the reconstituted material.

7 Claims, 1 Drawing Sheet

DRILL CUTTINGS SOLIDIFICATION FOR WETLANDS RESTORATION

CROSS-REFERENCE TO RELATED APPLICATIONS

Claims priority of U.S. Provisional Application Ser. No. 60/116,366, filed Jan. 19, 1999.

BACKGROUND OF THE INVENTION

1. Field of the Invention

The present invention pertains to a drill cuttings disposal method and system wherein the cuttings are treated to form a solidified material which in turn will be re-used to shore up wetlands with the areas stated by the Federal Wetlands Act.

2. General Background of the Invention

The disposal of drill cuttings from drilling various types of wells has become an increasingly difficult problem due to restrictions imposed by various governmental authorities and the desire to minimize environmental damage. These problems are aggravated or at least amplified in certain well drilling operations, particularly in offshore or inland waters drilling operations, wherein the disposal of drill cuttings normally requires transport of the cuttings to a suitable landfill or shore-based processing system.

One solution to drill cuttings disposal problems is disclosed and claimed in U.S. patent application Ser. No. 07/322,585 to Edward Malachosky, et al, now U.S. Pat. No. 4,942,929, and assigned to the assignee of the present invention. In the system disclosed in the above referenced application, drill cuttings are separated from the drilling fluid and reclaimed for use as construction grade gravel. Finer particles of material are slurried and injected into an earth formation through a disposal well. However, disposal of all the drill cuttings, in many instances, is not as conveniently handled, particularly in inland well drilling operations.

It is to this end that the present invention has been developed with a view to providing a system and method for disposing of drill cuttings which are removed from the drilling fluid during the drilling process and are suitable for reuse and subsequent reclamation for recycling in the restoration of wetlands area.

BRIEF SUMMARY OF THE INVENTION

The present invention provides a unique method for the disposal of drill cuttings produced during the drilling of wells, particularly in inland waterways well drilling operations. In accordance with an important aspect of the present invention, drilling cuttings returned to the surface are separated from the drilling fluid, mixed with a suitable stabilization medium, preferably lime, cement, fly ash, gypsum, or a combination of the same, and solidified. Any harmful constituents (e.g. oil or heavy metals) that could possibly be in the drill cuttings are confined within the stabilization medium.

Those skilled in this area will recognize the above described advantages and superior features of the invention together with other aspects thereof upon reading the detailed description which follows in conjunction with the drawing.

Industry in general has been barraged with environmental regulations that have changed and will continue to permanently change the way in which cuttings generated during the drilling of an oil well are disposed. The process recommended in this document incorporates three parts: 1) a method to minimize the volume of waste generated, 2) ways of recycling useful components of the liquids, and 3) identification of a viable process to solidify/stabilize the drill cuttings to be used to restore valuable marshland.

DETAILED DESCRIPTION OF THE INVENTION

1. Fluid Processing

Figure 1:
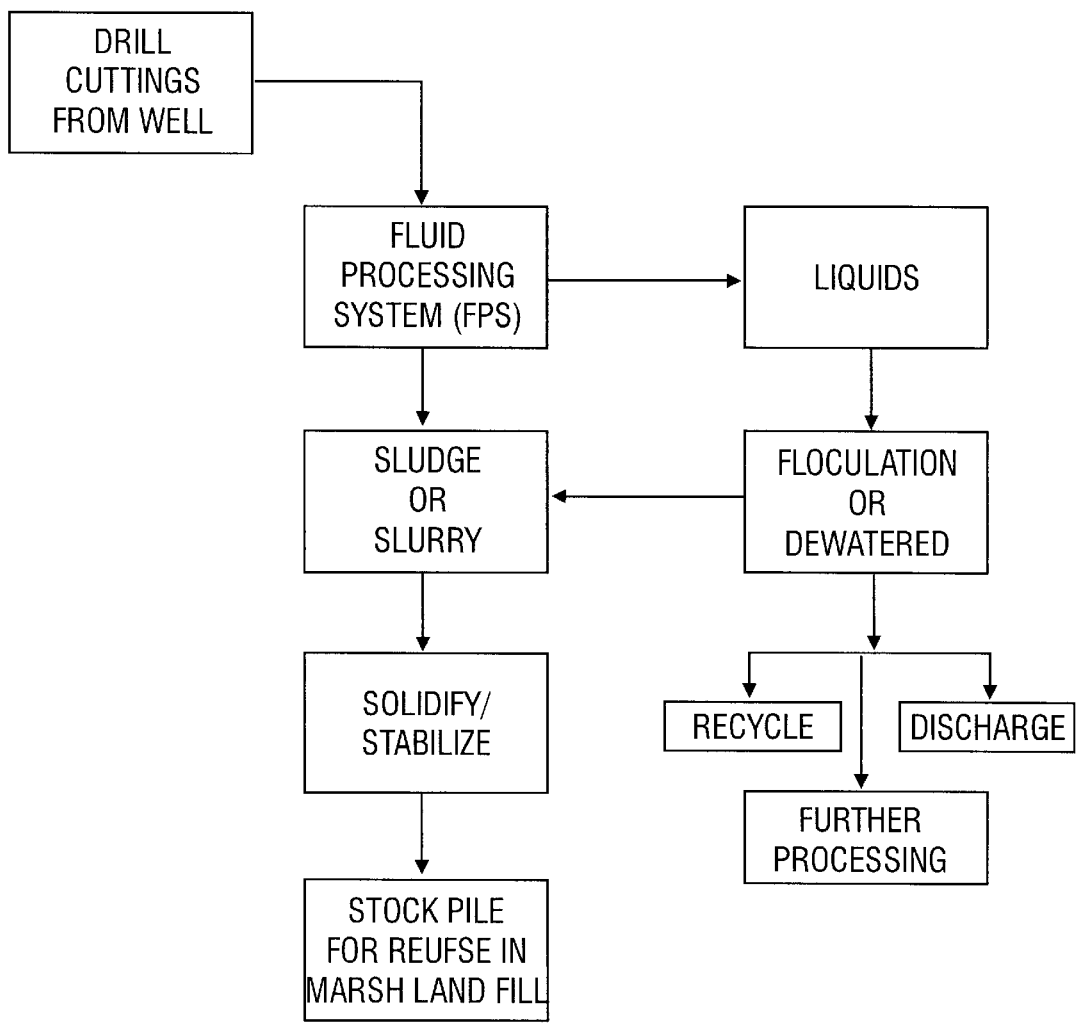
FIG. 1 is a schematic diagram illustrating the drill cuttings disposal system of the present invention.

During the drilling of the oil well, drill cuttings are generated and then removed from the drilling fluid. The equipment used to remove the drill cuttings from the drilling fluid varies based on the amount, size, and type of formation drilled. Due to the economics associated in the overall operation, it is best to minimize the amount of drilling fluid and associated liquids on the cuttings. This can be accomplished by the proper sizing of the complete solids control equipment system.

2. Cuttings Transfer

Transporting the sludge or slurry made up of drill cuttings and drilling fluid from the fluids processing system to the blending equipment can be handled several ways. Trackhoes, submersible pumps, and vacuums, either alone or in combinations, move material from reserve pits, catch tanks, or shale barges into a blending system.

3. Blending and Stabilization

Since the processed material must meet stringent local, state, and federal regulations to be classified as reuse material, insurance in the uniformity of the end product is essential. This is accomplished by blending the waste, solidifying agent(s), and water (if necessary) in a mill designed for this purpose. Adapted from the mining industry, the units are rugged (easy to maintain) and simple in design. This is the central component to the system and required in virtually all applications. The metals in the drilling fluid are chemically transformed to metal hybrids and the chlorides and/or any hydrocarbons are encapsulated.

4. Transport and Stockpile

The processed material must be carried away from the discharge end of the mill. Front-end loaders, vacuums, and a combination of side belts and radial stacking conveyors have been successfully used for this purpose. The material is tested to ensure that it meets all reuse criteria. Minimum testing is conducted at least once per type of drilling fluid being utilized. The final product is stockpiled for use in restoring the wetlands.

5. Solidification Equipment

The below listed equipment is used for solidification work. Depending on the application, the components required will vary and can be selected from the list to arrive at a daily equipment rental rate.

Sand Screw
Pug mill
P-Tank, Blower, & RV Feeder
Pump (Cuttings)
Catch Tank & Pump Radial Stacker Side Belt Cuttings material is mixed with solidification agents such as lime, cement, fly ash, gypsum, or a combination of the same to solidify the cuttings. Equipment used during the solidification process includes a Pug Mill, P-Tank, Blower, RV Feeder, Pump (Cuttings), Catch Tank, and a centrifugal pump. The solidification agents are stored in a pressurized tank (P-Tank) and blown into the pug mill for blending with the cuttings. The RV feeder, catch tank, and pumps transfer the raw and solidified cuttings to and from the pug mill. FIG. 1 is a schematic diagram illustrating the drill cuttings disposal system of the present invention.

6. Examples

One embodiment of the present invention includes a method of restoring wetlands that includes collecting drill cuttings during the drilling of a well bore and then separating the drill cuttings from the drilling fluid. The cuttings are then mixed with a stabilization medium selected from the group comprised of fly ash, lime, cement, and gypsum. The embodiment also includes placing the stabilized cuttings in a wetlands area that is to be restored.

Another embodiment of the present invention includes a method of restoring wetlands that includes collecting drill cuttings during the drilling of a well bore and then separating the drill cuttings from the drilling fluid. The cuttings are then mixed with a stabilization medium such as lime, gypsum, cement, or fly ash to form a cementatious matrix so that any harmful constituents are confined within the cementatious matrix. The embodiment also includes placing the stabilized cuttings in a wetlands area that is to be restored.

Yet another embodiment of the present invention includes a method of restoring wetlands including collecting drill cuttings during the drilling of a well bore and separating the drill cuttings from the drilling fluid. The cuttings are then mixed with a stabilization medium that confines any harmful constituents within a cementatious matrix. The embodiment further included filling part of a wetlands area with the stabilized drill cuttings.

Another embodiment of the present invention includes a method of restoring wetlands that includes collecting drill cuttings during the drilling of a well bore and separating the drill cuttings from the drilling fluid. The liquids separated from the drill cuttings are then dewatered by removing solids therefrom. The cuttings are then mixed with a stabilization medium that includes the solids previously removed from the liquids. The embodiment also includes placing the stabilized cuttings in a wetlands area that is to be restored.

Another embodiment of the present invention includes a method of processing drill cuttings that includes collecting drill cuttings during the drilling of a well bore and separating liquids that include drilling fluid from the well cuttings. The liquids are then dewatered to produce a liquid stream and dewatered solids. The embodiment also includes forming a slurry or sludge with the drill cuttings and the dewatered solids. The slurry or sludge is then solidified to produce a fill material for use as wetlands landfill.

Although this invention has been illustrated by reference to specific embodiments, it will be apparent to those skilled in the art that various charges and modifications may be made which clearly fall within the scope of the invention. Thus, the foregoing embodiments are presented by way of example only and the scope of the present invention is to be limited only by the following claims.

What is claimed is:

1. A method of restoring wetlands comprising the steps of
   a) collecting drill cuttings during the drilling of a well bore;
   b) separating the drill cuttings from the drilling fluid;
   c) mixing the cuttings with a stabilization medium; and
   d) placing the stabilized cuttings in a wetlands area that is to be restored.

2. A method of restoring wetlands comprising the steps of
   a) collecting drill cuttings during the drilling of a well bore;
   b) separating the drill cuttings from the drilling fluid;
   c) mixing the cuttings with a stabilization medium to form a cementatious matrix so that any harmful constituents are confined within the cementateous matrix; and
   d) placing the stabilized cuttings in a wetlands area that is to be restored.

3. A method of restoring wetlands comprising the steps of
   a) collecting drill cuttings during the drilling of a well bore;
   b) separating the drill cuttings from the drilling fluid;
   c) mixing the cuttings with a stabilization medium that confines any harmful constituents within a cementatious matrix; and
   d) filling part of a wetlands area with the stabilized drill cuttings.

4. A method of restoring wetlands comprising the steps of
   a) collecting drill cuttings during the drilling of a well bore;
   b) separating the drill cuttings from the drilling fluid;
   c) mixing the cuttings with a stabilization medium;
   d) placing the stabilized cuttings in a wetlands area that is to be restored; and
   e) wherein liquids separated from the drill cuttings are dewatered before stabilization by removing solids therefrom, and wherein the removed solids are used as part of the stabilization medium.

5. A method of processing drill cuttings comprising the steps of:
   a) collecting drill cuttings during the drilling of a well bore;
   b) separating liquids that include drilling fluid from the well cuttings;
   c) dewatering the liquids to produce a liquid stream and dewatered solids;
   d) forming a slurry or sludge with the drill cuttings and the dewatered solids generated in step "c";
   e) solidifying the slurry or sludge to produce a fill material; and
   f) using solid fill material for use as to wetlands landfill.

6. The method as described in claim 1, wherein said stabilization medium is selected from the group consisting of fly ash, lime, cement, and gypsum.

7. The method as described in claim 2, wherein said stabilization medium is selected from the group consisting of fly ash, lime, cement, and gypsum.

* * * * *

UNITED STATES PATENT AND TRADEMARK OFFICE
CERTIFICATE OF CORRECTION

PATENT NO. : 6,322,489 B1
DATED : November 27, 2001
INVENTOR(S) : Timothy R. Richardson and Paul M. Hanson It is certified that error appears in the above-identified patent and that said Letters Patent is hereby corrected as shown below:

<u>Column 4,</u>
Line 57, should read as follows:
-- f) using said fill material for use as wetlands landfill. --

Signed and Sealed this

Fourth Day of June, 2002

*Attest:*

*Attesting Officer*

JAMES E. ROGAN
*Director of the United States Patent and Trademark Office*